(12) United States Patent
Soetarman et al.

(10) Patent No.: US 6,792,416 B2
(45) Date of Patent: Sep. 14, 2004

(54) MANAGING RESULTS OF FEDERATED SEARCHES ACROSS HETEROGENEOUS DATASTORES WITH A FEDERATED RESULT SET CURSOR OBJECT

(75) Inventors: Basuki N. Soetarman, Los Gatos, CA (US); Robert Nelson Summers, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/400,532

(22) Filed: Sep. 21, 1999

(65) Prior Publication Data

US 2003/0004931 A1 Jan. 2, 2003

(51) Int. Cl.⁷ .............................. G06F 17/30
(52) U.S. Cl. ................ 707/3; 707/1; 707/10; 707/103 R
(58) Field of Search ............... 707/1–4, 5, 9–10, 707/100–104.1, 200–206; 709/303

(56) References Cited

U.S. PATENT DOCUMENTS

| | | | |
|---|---|---|---|
| 4,525,803 A | 7/1985 | Vidalin et al. | 707/3 |
| 4,646,061 A | 2/1987 | Bledsoe | 340/347 |
| 5,202,981 A | 4/1993 | Shackelford | 707/1 |
| 5,303,342 A | 4/1994 | Edge | 358/1.1 |
| 5,317,736 A | 5/1994 | Bowen | 707/103 |
| 5,355,493 A | 10/1994 | Silberbauer et al. | 717/1 |
| 5,596,748 A * | 1/1997 | Kleewein et al. | 707/10 |
| 5,706,499 A * | 1/1998 | Kleewein et al. | 707/10 |
| 5,708,828 A | 1/1998 | Coleman | 707/523 |
| 5,742,806 A | 4/1998 | Reiner et al. | 707/3 |
| 5,745,906 A | 4/1998 | Squibb | 707/203 |

(List continued on next page.)

FOREIGN PATENT DOCUMENTS

| | | |
|---|---|---|
| EP | 169389 A | 1/1986 |
| EP | 228213 A | 7/1987 |
| EP | 532004 A | 3/1993 |
| EP | 632364 A | 1/1995 |
| EP | 632366 A | 1/1995 |
| EP | 678986 A | 10/1995 |
| EP | 711083 A | 5/1996 |
| EP | 712257 A | 5/1996 |
| EP | 755161 A | 1/1997 |
| EP | 757333 A | 2/1997 |
| EP | 0838 771 A | 4/1998 |
| EP | 0 838 771 A2 | 4/1998 |
| JP | 11122116 A | 4/1998 |
| JP | 11075160 A | 3/1999 |
| WO | WO 8802888 A | 4/1988 |
| WO | WO 9617306 A | 11/1995 |
| WO | WO 98 35480 A | 8/1998 |

OTHER PUBLICATIONS

Amit P. Sheth et al; Federated Database Systems for Managing Distributed, Heterogeneous, and Autonomous Databases; Sep. 1990; ACM; pp. 183–236.*

(List continued on next page.)

*Primary Examiner*—Shahid Alam
*Assistant Examiner*—Jean Bolte Fleurantin
(74) *Attorney, Agent, or Firm*—Sughrue Mion, PLLC

(57) ABSTRACT

A method, apparatus, and article of manufacture for managing results of federated searches across heterogeneous datastores with a federated result set cursor object. One or more commands are executed in a computer to perform a datastore operation at a computer. Data is located in one or more datastores. A cursor is set to the located data in each datastore. A set of cursors to the located data is returned.

18 Claims, 10 Drawing Sheets

U.S. PATENT DOCUMENTS

| | | | | |
|---|---|---|---|---|
| 5,752,252 | A | | 5/1998 | Zbikowski et al. ......... 707/205 |
| 5,774,888 | A | | 6/1998 | Light ............................ 707/1 |
| 5,835,904 | A | * | 11/1998 | Vicik et al. .................... 707/1 |
| 5,864,866 | A | | 1/1999 | Henckel et al. ............. 707/103 |
| 5,884,303 | A | | 3/1999 | Brown .......................... 707/3 |
| 5,893,119 | A | | 4/1999 | Squibb ...................... 707/203 |
| 5,903,894 | A | | 5/1999 | Reneris ...................... 707/100 |
| 5,987,465 | A | * | 11/1999 | Kleewein et al. ............. 707/10 |
| 6,233,586 | B1 | * | 5/2001 | Chang et al. ............... 707/103 |
| 6,263,342 | B1 | * | 7/2001 | Chang et al. ............... 707/103 |
| 6,272,488 | B1 | * | 8/2001 | Chang et al. .................. 707/4 |
| 6,343,287 | B1 | * | 1/2002 | Kumar et al. ............... 707/100 |
| 6,370,541 | B1 | * | 4/2002 | Chou et al. ............. 707/103 X |
| 6,466,933 | B1 | * | 10/2002 | Huang et al. .................. 707/3 |
| 6,578,046 | B2 | * | 6/2003 | Chang et al. ................. 707/10 |

OTHER PUBLICATIONS

Sheth et al., Federated Database Systems for Managing Distributed Hetogeneous and Autonomous Databases, ACM Computing Surveys, vol. 22, No. 3, Sep. 1990.*

"DB2 Universal Database Server for OS/390, version 6, DB2 Universal database Extenders", International Business Machines Corporation, pp. 1–8, May 1998.

"Information Intergration with IBM DB2 DataJoinder Version 2", White Paper, Data Management Solutions, International Business Corporation, First Edition Sep. 1997.

"Informix Datablade Technology", http://www.informix.com/informix/products/options/udo/datablade/dbtech/overview.

"Informix Datablade Technology—To get to the top and stay there, your business must work smarter; you must think ahead and continuously adapt to new market conditions and take advantage of new opportunities as they arise", http://www.informix.com/informix/products/options/udo/datablade/dbtech/ov.../db intro.ht.

"Informix Datablade Technology—Informix Dynamic Server–Univeral Data Option fast, Intergrated–and Extensible", http://www.informix.com/informix/products/options/udo/datablade/dbtech/overview/body.htm.

"Informix Datablade Technology—Transforming Data into Smart Data ", http://www. informix.com/informix/products/integration/datablade/datablade ds.htm.

"Jini—Technology Executive Overview", Sun Microsystems, Inc. Jan. 1999 http://ww.sun.com/jini/overview/overview.pdf.

Oracle8i Data Cartridge Developer's Guide Release 8.1.5 A68002–01, Oracle Corporation, 1999.

"Jini—Connection Technology", Sun Microsystems, Inc. 1999 http://www.sun.com/jini.

Shatz, B. et al., "Federating diverse collections of scientific literature", Computer, vol. 29, No. 5, pp. 28–36, May 1996 (abstract).

* cited by examiner

MANAGING RESULTS OF FEDERATED SEARCHES ACROSS HETEROGENEOUS DATASTORES WITH A FEDERATED RESULT SET CURSOR OBJECT

CROSS-REFERENCE TO RELATED APPLICATIONS

This application is related to the following co-pending and commonly-assigned patent applications:

application Ser. No. 09/399,696, entitled "THE ARCHITECTURE AND IMPLEMENTATION OF A DYNAMIC RMI SERVER CONFIGURATION HIERARCHY TO SUPPORT FEDERATED SEARCH AND UPDATE ACROSS HETEROGENEOUS DATASTORES," filed on same date herewith, by Kehsing J. Chou et al.,;

application Ser. No. 09/400,638,U.S. Pat. No. 6,370,541, titled "THE DESIGN AND IMPLEMENTATION OF A CLIENT/SERVER FRAMEWORK FOR FEDERATED MULTI-SEARCH AND UPDATE ACROSS HETEROGENEOUS DATASTORES," filed on same date herewith, by Kehsing J. Chou et al.,;

application Ser. No. 09/399,682, entitled "ARCHITECTURE TO ENABLE SEARCH GATEWAYS AS PART OF FEDERATED SEARCH," filed on same date herewith, by Kehsing J. Chou et al., application Ser. No. 09/399,697, entitled "DELAYED DELIVERY OF QUERY RESULTS OR OTHER DATA FROM A FEDERATED SERVER TO A FEDERATED CLIENT UNTIL SUCH INFORMATION IS NEEDED," filed on same date herewith, by M. W. Huang et al.,;

application Ser. No. 09/399,695, entitled "IMPROVED EXTENDED DATA OBJECT ARCHITECTURE FOR HANDLING MULTI-STREAMING AND COMPLEX MULTI-DIMENSIONAL FILES," filed on same date herewith, by Kehsing J. Chou et al.,;

application Ser. No. 08/852,062, U.S. Pat. No. 5,960,438, entitled "CLASS HIERARCHY FOR OBJECT AGGREGATION REPRESENTATION OF RELATIONAL DATABASE ROWS WITH CELLS HAVING NONTRADITIONAL DATATYPES," filed on May 6, 1997, by Daniel T. Chang et al.,;

application Ser No. 08/852,055, U.S. Pat. No. 5,924,100, entitled "FLEXIBLE OBJECT REPRESENTATION OF RELATIONAL DATABASE CELLS HAVING NONTRADITIONAL DATATYPES," filed on May 6, 1997, by Daniel T. Chang et al., application Ser. No. 09/052,678, U.S. Pat. No. 6,272,488, entitled "MANAGING RESULTS OF FEDERATED SEARCHES ACROSS HETEROGENEOUS DATASTORES WITH A FEDERATED COLLECTION OBJECT," filed on Apr. 1, 1998, by Daniel T. Chang et al.,;

application Ser. No. 09/052,680, U.S. Pat. No. 6,263,342, entitled "FEDERATED SEARCHING OF HETEROGENEOUS DATASTORES USING A FEDERATED DATASTORE OBJECT," filed on Apr. 1, 1998, by Daniel T. Chang et al.,; and application Ser. No. 09/052,679, U.S. Pat. No. 6,233,586, entitled "FEDERATED SEARCHING OF HETEROGENEOUS DATASTORES USING A FEDERATED QUERY OBJECT," filed on Apr. 1, 1998, by Daniel T. Chang et al.,;

each of which is incorporated by reference herein.

BACKGROUND OF THE INVENTION

1. Field of the Invention

This invention relates in general to database management systems performed by computers, and in particular, to managing results of federated searches across heterogeneous datastores with a federated result set cursor object.

2. Description of Related Art

The present invention relates to a system and method for representing and searching multiple heterogeneous datastores and managing the results of such searches. Datastore is a term used to refer to a generic data storage facility, such as a relational data base, flat-file, hierarchical data base, etc. Heterogeneous is a term used to indicate that the datastores need not be similar to each other. For example, each datastore may store different types of data, such as image or text, or each datastore may be based on a different theory of data model, such as Digital Library/VisualInfo or Domino Extended Search (DES).

For nearly half a century computers have been used by businesses to manage information such as numbers and text, mainly in the form of coded data. However, business data represents only a small part of the world's information. As storage, communication and information processing technologies advance, and as their costs come down, it becomes more feasible to digitize other various types of data, store large volumes of it, and be able to distribute it on demand to users at their place of business or home.

New digitization technologies have emerged in the last decade to digitize images, audio, and video, giving birth to a new type of digital multimedia information. These multimedia objects are quite different from the business data that computers managed in the past, and often require more advanced information management system infrastructures with new capabilities. Such systems are often called "digital libraries."

Bringing new digital technologies can do much more than just replace physical objects with their electronic representation. It enables instant access to information; supports fast, accurate, and powerful search mechanisms; provides, new "experiential" (i.e. virtual reality) user interfaces; and implements new ways of protecting the rights of information owners. These properties make digital library solutions even more attractive and acceptable not only to corporate IS organizations, but to the information owners, publishers and service providers.

Generally, business data is created by a business process (an airline ticket reservation, a deposit at the bank, and a claim processing at an insurance company are examples). Most of these processes have been automated by computers and produce business data in digital form (text and numbers). Therefore it is usually structured coded data. Multimedia data, on the contrary, cannot be fully pre-structured (its use is not fully predictable) because it is the result of the creation of a human being or the digitization of an object of the real world (x-rays, geophysical mapping, etc.) rather than a computer algorithm.

The average size of business data in digital form is relatively small. A banking record—including a customers name, address, phone number, account number, balance, etc.—represents at most a few hundred characters, i.e. few hundreds/thousands of bits. The digitization of multimedia information (image, audio, video) produces a large set of bits called an "object" or "blobs" (Binary Large Objects). For example, a digitized image of the parchments from the Vatican Library takes as much as the equivalent of 30 million characters (30 MB) to be stored. The digitization of a movie, even after compression, may take as much as the equivalent of several billions of characters (3–4 GB) to be stored.

Multimedia information is typically stored as much larger objects, ever increasing in quantity and therefore requiring special storage mechanisms. Classical business computer systems have not been designed to directly store such large objects. Specialized storage technologies may be required for certain types of information, e.g. media streamers for video or music. Because certain multimedia information needs to be preserved "forever" it also requires special storage management functions providing automated back-up and migration to new storage technologies as they become available and as old technologies become obsolete.

Finally, for performance reasons, the multimedia data is often placed in the proximity of the users with the system supporting multiple distributed object servers. This often requires a logical separation between applications, indices, and data to ensure independence from any changes in the location of the data.

The indexing of business data is often imbedded into the data itself. When the automated business process stores a person's name in the column "NAME," it actually indexes that information. Multimedia information objects usually do not contain indexing information. This "meta data" needs to be created in addition by developers or librarians. The indexing information for multimedia information is often kept in "business like" databases separated from the physical object.

In a Digital Library (DL), the multimedia object can be linked with the associated indexing information, since both are available in digital form. Integration of this legacy catalog information with the digitized object is crucial and is one of the great advantages of DL technology. Different types of objects can be categorized differently as appropriate for each object type. Existing standards like MARC records for libraries, Finding Aids for archiving of special collections, etc . . . can be used when appropriate.

The indexing information used for catalog searches in physical libraries is mostly what one can read on the covers of the books: authors name, title, publisher, ISBN, . . . enriched by other information created by librarians based on the content of the books (abstracts, subjects, keywords, . . . ). In digital libraries, the entire content of books, images, music, films, etc. are available and "new content" technologies are needed; technologies for full text searching, image content searching (searching based on color, texture, shape, etc . . . ), video content searching, and audio content searching. The integrated combination of catalog searches (e.g. SQL) with content searches will provide more powerful search and access functions. These technologies can also be used to partially automate further indexing, classification, and abstracting of objects based on content.

To harness the massive amounts of information spread throughout these networks, it has become necessary for a user to search numerous storage facilities at the same time without having to consider the particular implementation of each storage facility.

Object-oriented approaches are generally better suited for such complex data management. The term "object-oriented" refers to a software design method which uses "classes" and "objects" to model abstract or real objects. An "object" is the main building block of object-oriented programming, and is a programming unit which has both data and functionality (i.e., "methods"). A "class" defines the implementation of a particular kind of object, the variables and methods it uses, and the parent class it belongs to.

Some known programming tools that can be used for developing search and result-management frameworks include IBM VisualAge C++, Microsoft Visual C++, Microsoft Visual J++, and Java. A result set cursor is a feature supported by modern database management systems, such as relational databases (e.g., DB2, Oracle, Sybase, Informix, etc.). A result set cursor is an indicator that indicates the location of data. All conventional result set cursors are flat in that they provide a single cursor to the retrieved data. Consequently, all implementations of result set cursors in the above mentioned frameworks are also flat implementations.

There is a need in the art for an improved federated system. In particular, there is a need in the art for managing results of federated searches across heterogeneous datastores with a federated result set cursor object.

SUMMARY OF THE INVENTION

To overcome the limitations in the prior art described above, and to overcome other limitations that will become apparent upon reading and understanding the present specification, the present invention discloses a method, apparatus, and article of manufacture for managing results of federated searches across heterogeneous datastores with a federated result set cursor object.

According to an embodiment of the invention, one or more commands are executed in a computer to perform a datastore operation at a computer. Data is located in one or more datastores. A cursor is set to the located data in each datastore. A set of cursors to the located data is returned.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Federated Architecture

Figure 1:
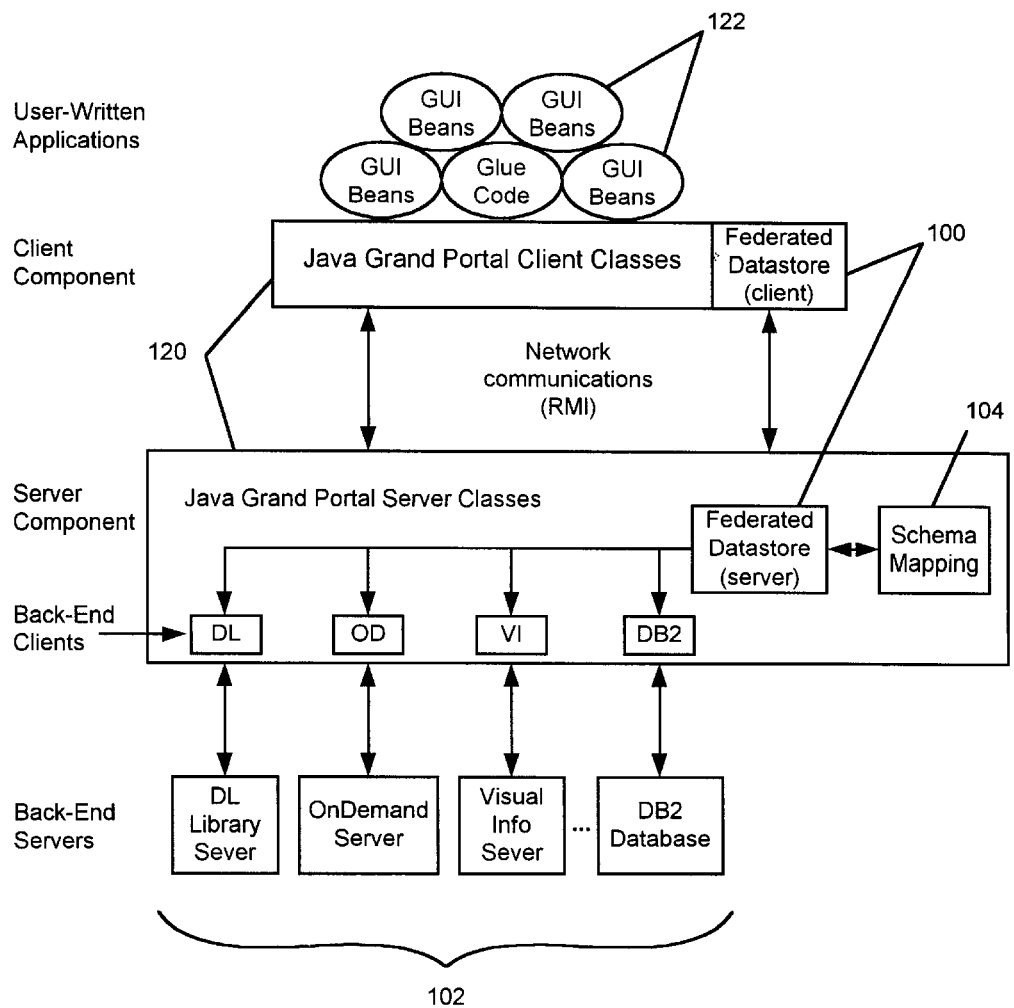
FIG. 1 is a diagram illustrating a computer architecture that could be used in accordance with the present invention.

FIG. 1 is a diagram illustrating a computer architecture that could be used in accordance with the present invention. The present invention is described herein by way of example and is not intended to be limited to the described embodiment. The description of the preferred embodiment is based on, but certainly not limited to, the IBM design of Java Grand Portal Class Library, the Digital Library Java Application Programming Interface (API).

The Java Grand Portal 120 is comprised of client and server classes. In particular, Java Grand Portal is a set of Java classes which provides access and manipulation of local or remote data stored in Digital Library storage facilities. It uses Java APIs based on OMG-Object Query Services (OQS) and a Dynamic Data Object protocol, which is a part of OMG/Persistence Object Services.

The Java APIs provide multi-search capabilities such as:
1. Searching within a given datastore using one or a combination of supported query types, i.e.
   Parametric query—Queries requiring an exact match on the condition specified in the query predicate and the data values stored in the datastore.
   Text query—Queries on the content of text fields for approximate match with the given text search expression, e.g. the existence (or non-existence) of certain phrases or word-stems.
   Image query—Queries on the content of image fields for approximate match with the given image search expression, e.g. image with certain degree of similarity based on color percentages, layout, or texture.
2. Each search type is supported by one or more search-engines.
3. Searching on the results of a previous search.
4. Searching involving heterogeneous datastores.

The Digital Library Grand Portal classes provide a convenient API for Java application users; the applications can be located at local or remote sites. Java classes will typically reside on both server and client sides; both sides providing the same interface. The client side of Java classes communicates with the server side to access data in the Digital Library through the network. Communication between client and server sides is done by these classes; it is not necessary to add any additional programs.

In particular, FIG. 1 is an architectural diagram outlining the structure of the federated search for Digital Library repositories using the federated datastore 100, comprised of a federated datastore client and server. A federated datastore 100 is a virtual datastore which combines several heterogeneous datastores 102 into a consistent and unified conceptual view. This view, or a federated schema, is established via schema mapping 104 of the underlying datastores. The users interact with a federated datastore 100 using the federated schema, without needing to know about the individual datastores 102 which participate in the federated datastore 100.

One embodiment of the invention provides a federated result set cursor object across heterogeneous datastores. In one embodiment of the invention, one or more classes implement the federated result set cursor object, and one or more methods are provided to manipulate the federated result set cursor object. In one embodiment, the class definitions and methods reside at the federated datastore client and server.

The federated datastore 100 does not have a corresponding back-end client. Since it is a virtual datastore, the federated datastore 100 relies on the underlying physical back-end client associated with it, such as the DL client (i.e., Digital Library client), OnDemand, VisualInfo, DB2, etc. Digital Library, OnDemand, VisualInfo, and DB2 are all products from International Business Machines Corporation. As mentioned before, this association is established by a schema mapping component 104.

The communication between the federated datastore 100 client and server can be done by any appropriate protocol. On top of Java Grand Portal client classes, the users can develop application programs using, for example, any existing Java Beans 122 development environment.

The federated datastore 100 coordinates query evaluation, data-access, and transaction processing of the participating heterogeneous datastores 102. Given the federated schema, a multi-search query can be formulated, executed, and coordinated to produce results in the form of a datastore-neutral dynamic data object.

Note that each heterogeneous datastore and the federated datastore are created using one datastore definition or super-class. The federated datastore 100 and the heterogeneous datastores 102 are all subclasses of a class called Datastore, therefore, all of these datastores 100 and 102 have the same interface. Therefore, a user would be able to access the federated datastore 100 and the heterogeneous datastores 102 in a consistent and uniform manner.

Additionally, the objects stored in the federated datastore 100 and the heterogeneous datastores 102 are subclasses of a Data Object class. The Data Object class includes subclasses for dynamic data objects (DDOs) and extended data objects (XDOs). A DDO has attributes, with type, value, and properties. The value of an attribute can be a reference to another DDO or XDO, or a collection of DDOs or XDOs.

Figure 2:
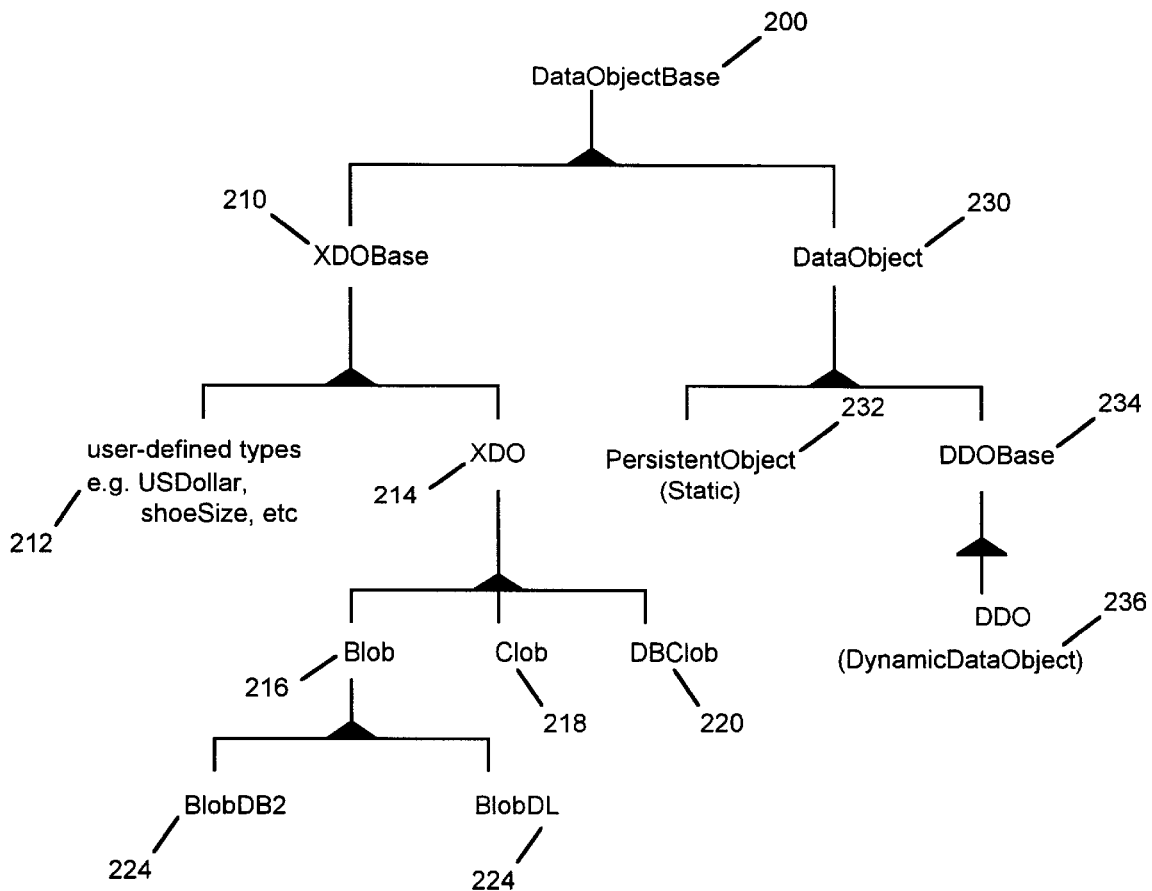
FIG. 2 is a diagram illustrating a class hierarchy for Data Object classes.

FIG. 2 is a diagram illustrating a class hierarchy for Data Object classes. The objects stored in and manipulated by the datastores and fetch operations belong to data object classes. These objects are returned as the result of a fetch, or created and used in CRUD (add, retrieve, update, delete) operations.

A DataObjectBase 200 is an abstract base class for all data objects known by datastores. It has a protocol attribute, that indicates to the datastore which interface can be used to operate on this object. A DOBase 210 is the base class used to represent user-defined-types (UDT) or large objects. In particular, the XDOBase 210 is the base class for some user-defined types 212 and XDOs 214. A XDO 214 represents complex UDTs or large objects (LOB). This object can exist stand-alone or as a part of a DDO 236. Therefore, it has a persistent object identifier and CRUD operations capabilities.

Blob 216 is a base class for BLOBs as a placeholder to share all generic operations pertaining to BLOBs. Clob 218 is a base class for CLOBs (Character Large Objects) as a placeholder to share all generic operations pertaining to CLOBs. DBClob 220 is a base class for DBCLOBs (database character large object) as a placeholder to share all generic operations pertaining to DBCLOBs. BlobDB2 222 represents a BLOB specific to DB2, and BlobDL 22 represents a BLOB specific to DL. Similarly, though not shown, there may be subclasses for ClobDB2, ClobDL, etc.

A DataObject 230 is a base class for PersistentObject 232 and DDOBase 234. A PersistentObject 232 represents a specific object whose code is statically generated and compiled. This type of object will not be covered in this document. A DDOBase 234 is a base class for a dynamic data object 236 (without the CRUD methods). A DDO (Dynamic Data Object) 236 represents generic data objects which are constructed dynamically at runtime. This object fits well with query and browsing activities in Grand Portal where objects are only known and generated at runtime. It supports the CRUD operations (add, retrieve, update, and delete), and, with the help of its associated datastore, a DDO can put itself into and out of the datastore.

One skilled in the art would recognize that these are only example classes and subclasses and other structures maybe used for objects and other classes or subclasses may be added to or removed from the tree shown in FIG. 2.

With respect to the notion of "federation", each participating datastore preserves the right to maintain its "personality", i.e. its own query language, data-model or schema, method of interaction, etc, and at the same time cooperating in a federation to provide a federated schema. This design allows the users to preserve the natural view to their favorite datastore as well as access them in conjunction with other datastores in a federated context.

The federated datastore 100 can combine the participating native datastores in two ways:

With mapping. As described above, mapping of concepts across participating datastores is established to provide a unified conceptual view. Based on this federated schema, federated queries with both join and union expressions can be formulated.

Without mapping. In this case, the federated datastore 100 only reflects the union of each participating datastore's conceptual view. Although it coordinates query processing and data-access for each underlying datastore, the federated datastore 100 must accept queries in each datastore's native language since the query translation process can not be performed without mapping. In addition, since there is no conceptual mapping between datastores, the FederatedQuery 19 results can only reflect the union of results from each datastore.

The embodiment of the invention is incorporated into one or more software programs that reside at the federated datastore 100. Generally, the software programs and the instructions derived therefrom, are all tangibly embodied in a computer-readable medium, e.g. one or more of the data storage devices, which may be connected to the federated datastore 100. Moreover, the software programs and the instructions derived therefrom, are all comprised of instructions which, when read and executed by the computer system 100, causes the computer system 100 to perform the steps necessary to implement and/or use the present invention. Under control of an operating system, the software programs and the instructions derived therefrom, may be loaded from the data storage devices into a memory of the federated datastore 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Federated Datastore

Figure 3:
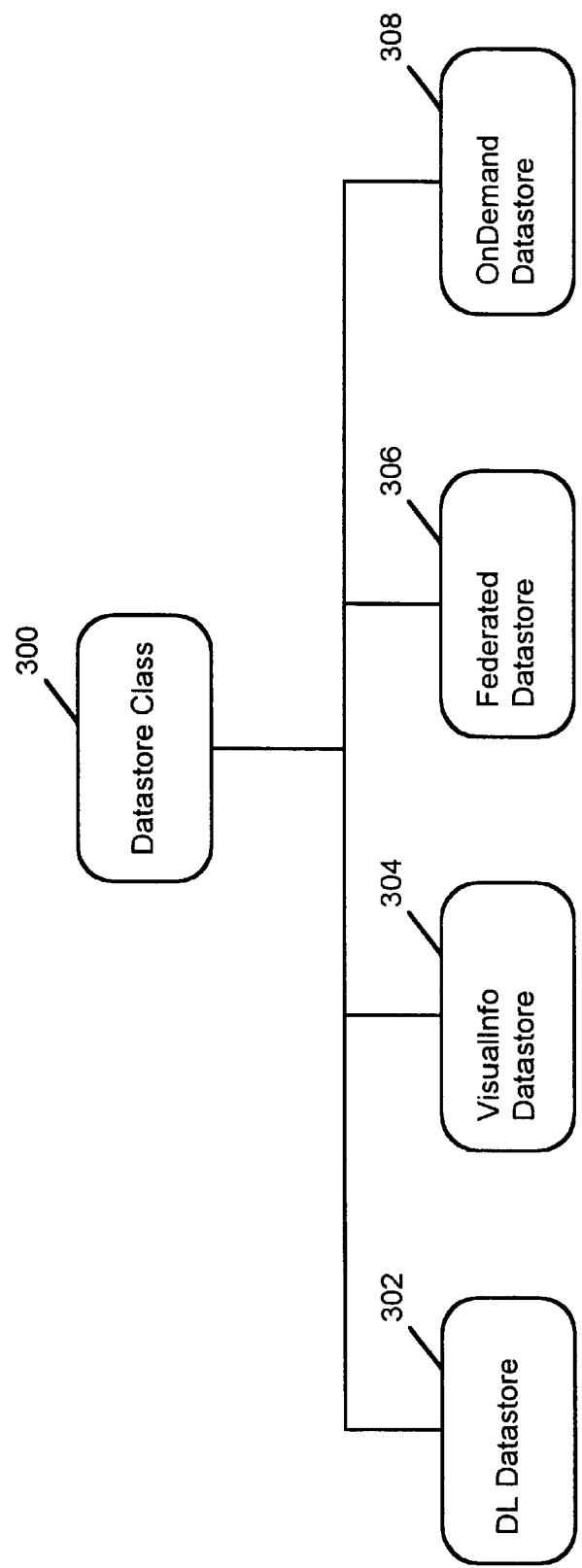
FIG. 3 is a diagram illustrating a class hierarchy for Datastore classes.

FIG. 3 is a diagram illustrating a class hierarchy for Datastore classes. A main datastore class 300 is an abstract base class (i.e., superclass) for all datastores. In particular, some datastore classes that are based on the datastore class 300 and inherit its characteristics are the following: a DL Datastore class 302, a VisualInfo Datastore class 304, a Federated Datastore class 306, and an OnDemand Datastore class 308. It is to be understood that the techniques of the invention may be applied to any data source and is not limited to the mentioned datastores.

Figure 4:
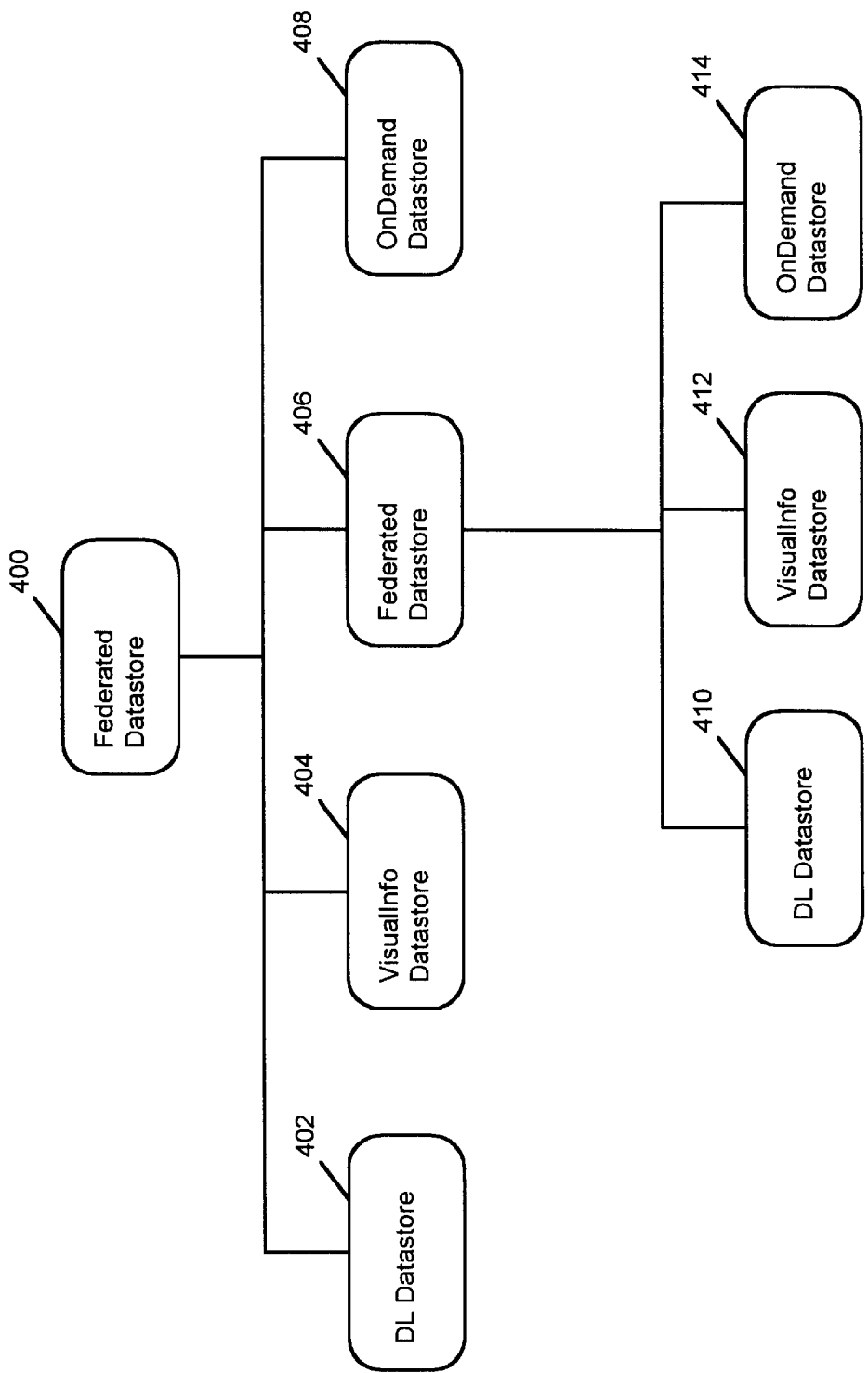
FIG. 4 is a diagram illustrating a conceptual view of a federated result set cursor object.

FIG. 4 is a diagram illustrating one composition of a federated datastore. The federated datastore 400 connects to heterogeneous datastores 402, 404, 406, and 408. As illustrated, a federated datastore 406 may connect to and be nested under federated datastore 400. Additionally, the federated datastore 406 may connect to heterogeneous datastores 410, 412, and 414. The depicted architecture is only a sample, and one skilled in the art would recognize that other examples fall within the scope of the invention.

In the preferred embodiment, the federated datastore 100 takes query strings expressed in a federated query language. An example class definition for the federated datastore (DKDatastoreFedjava) 100 is set forth below.

---

DKDatastoreFed.java

```
package com.ibm.mm.sdk.server;
public class DKDatastoreFed extends dkAbstractDataStore
    implements DKConstantFed,
        DKConstant,
        DKMessageIdFed,
        DKMessageId,
        dkFederation,
        java.io.Serializable
{
public dkCollection listEntities( ) throws DKException, Exception
public String[ ] listEntityNames( ) throws DKException, Exception
public String[ ] listTextEntityNames( ) throws DKException,
    Exception
public String[ ] listParmEntityNames( ) throws DKException,
    Exception
public dkCollection listEntityAttrs(String entityName) throws
    DKException, Exception
public String[ ] listEntityAttrNames(String entityName)
    throws DKException, Exception
public String registerMapping(DKNVPair sourceMap) throws
    DKException, Exception
public void unRegisterMapping(String mappingName) throws
    DKException, Exception
public String[ ] listMappingNames( ) throws
    DKException, Exception
public dkSchemaMapping getMapping(String mappingName) throws
    DKException, Exception
public synchronized dkExtension getExtension(String
    extensionName) throws DKException, Exception
public synchronized void addExtension(String extensionName,
    dkExtension extensionObj) throws DKException, Exception
public synchronized void removeExtension(String
    extensionName) throws DKException, Exception
public synchronized String[ ] listExtensionNames( )
    throws DKException, Exception
public DKDDO createDDO(String objectType,
    int Flags) throws DKException, Exception
public dkCollection listSearchTemplates( )
    throws DKException, Exception
public String[ ] listSearchTemplateNames( )
    throws DKException, Exception
public dkSearchTemplate getSearchTemplate(String templateName)
    throws DKException, Exception
public void destroy( ) throws DKException, Exception
public synchronized string addRemoveCursor (dkResultSetCursor
    iCurt int action) throws DKException, Exception
public dkDatastore datastoreByServerName (String dsType,
    String dsName) throws DKException, Exception
public void changePassword (String serverName,
    String user Id,
    String oldPwd,
    String newPwd)
    throws DKException, Exception
```

-continued

```
public void requestConnection (String serverName,
    String userId,
    String passwd,
    String connectString)
    throws DKException, Exception
public void excludeServer (Sting serverName, String templateName)
    throws DKException, Exception
public boolean isServerExcluded (String serverName, String
    templateName) throws DKException, Exception,
    java.rmi.RemoteException
public String[ ] listExcludedServers(String templateName)
    throws DKException, Exception
public void clearExcludedServers(String templateName)
    throws DKException, Exception
};
```

The following methods are part of the federated datastore class:

public DKDatastoreFed( ) throws DKException, Exception

Constructs default Federated Datastore.

public DKDatastoreFed(String configuration) throws DKException, Exception

Constructs default Federated Datastore.

public void connect(String datastore__name,
  String user__name,
  String authentication,
  String connect__string) throws DKException, Exception
Establishes a connection to a federated datastore.
Parameters:
datastore__name—federated datastore name
user__name—userid to logon to this federated datastore
authentication—password for this user__name
connect__string—additional information string
Throws: DKException
if either:
datastore__name, user__name, or authentication is null or
  if error occurs in the federated datastore
Overrides:
  connect in class dkAbstractDatastore public void disconnect( ) throws DKException, Exception Disconnects from the federated datastore.
Throws: DKException
if unable to disconnect from server.
Overrides:
disconnect in class dkAbstractDatastore public Object getOption(int option) throws DKException Gets defined datastore option
Parameters:
option—an option id
Returns:
the value for the given option
Throws: DKException
if option is not set
Overrides:
getOption in class dkAbstractDatastore public void setOption(int option, Object value) throws DKException Sets the given "option" with a specific "value".
Parameters:
option—an option id
value—the value for the "option"
Throws: DKException
if option/value is invalid
Overrides:
setOption in class dkAbstractDatastore public Object evaluate(String command,
  short commandLangType,
  DKNVPair params[]) throws DKException, Exception
Evaluates a query and returns the result as a dkQueryableCollection object.
Parameters:
command—a query string that represent the query criteria
commandLangType—a query language type, for Federated, it will be DK__FEDERATED__QL__TYPE
params—a name/value pairs list
Returns:
a query result collection
Throws: DKException
if "command" argument is null
Overrides:
evaluate in class dkAbstractDatastore public Object evaluate(dkQuery query) throws DKException, Exception Evaluates a query and returns the result as a dkQueryableCollection.
Parameters:
query—a given query object
Returns:
a query result collection
Throws: DKException
if the "query" input is null or not of federated query type.
Overrides:
evaluate in class dkAbstractDatastore public Object evaluate(DKCQExpr qe) throws DKException, Exception
Evaluates a query.
Parameters:
qe—a common query expression object
Returns:
a collection of the results
Throws: DKException
if common query expression object is invalid
Overrides:
evaluate in class dkAbstractDatastore public dkResultSetCursor execute(String command,
  short commandLangType,
  DKNVPair params[]) throws DKException, Exception
Executes a command query of the federated datastore and returns a result set cursor.

Parameters:
command—a query string that represents the query criteria.
commandLangType—a query language type, for Federated, it will be
DK_FEDERATED_QL_TYPE.
params[]—a name/value pairs list.
Returns:
a dkResultSetCursor object.
Throws: DKException
if "command" is null or invalid, or "commandLangType" is not Federated
Query type.
Overrides:
execute in class dkAbstractDatastore public dkResultSetCursor execute(dkQuery query) throws DKException, Exception
Executes a command query of the federated datastore and returns a result set cursor. This method takes a Federated query object as an argument.
Parameters:
query—a federated dkQuery object
Returns:
a dkResultSetCursor object
Throws: DKException
if "query" object is null or query.qlType( ) is not DK_FEDERATED_QL_TYPE
Overrides:
execute in class dkAbstractDatastore public dkResultSetCursor execute(DKCQExpr cqe) throws DKException, Exception Executes a query expression.
Parameters:
cqe—a common query expression object
Returns:
resultSetCursor which represents a federated datastore cursor.
Throws: DKException
if "cqe" object is invalid
Overrides:
execute in class dkAbstractDatastore public void execute WithCallback(dkQuery query,
dkCallback callbackObj) throws DKException, Exception
Executes a query with callback function.
Parameters:
query—a query object
callbackObj—a dkCallback object
Overrides:
executeWithCallback in class dkAbstractDatastore public void execute WithCallback(String command,
short commandLangType,
DKNVPair params[],
dkCallback callbackObj) throws DKException, Exception
Execute the query with callback function.
Parameters:
command—a query string
commandLang—a query type params—additional query option in name/value pair
callbackObj—a dkCallback object
Overrides:
executeWithCallback in class dkAbstractDatastore public void executeWithCallback(DKCQExpr cqe,
dkCallback callbackObj) throws DKException, Exception
Execute a query expression with callback function.
Parameters:
cqe—a common query expression object
callbackObj—a dkCallback object
Overrides:
executeWithCallback in class dkAbstractDatastore public dkQuery createQuery(String command,
short commandLangType,
DKNVPairparamsf[]) throws DKException
Creates a federated query object.
Parameters:
command—a query string that represents the query criteria
commandLangType—a query language type, it will be one of the following:
DK_CM_TEMPLATE_QL_TYPE
DK_CM_TEXT_QL_TYPE
DK_CM_IMAGE_QL_TYPE
DK_CM_PARAMETRIC_QL_TYPE
DK_CM_COMBINED_QL_TYPE params[]—a name/value pairs list
Returns:
a federated dkQuery object
Throws: DKException
if "command" is null
Overrides:
createQuery in class dkAbstractDatastore public dkQuery createQuery(DKCQExpr qe) throws DKException
Creates a query object.
Parameters:
cqe—a common query expression object
Throws: DKException
if "cqe" object is invalid
Overrides:
createQuery in class dkAbstractDatastore public dkCollection listDataSources( ) throws DKException
List the available datastore sources that a user can connect to.
Returns:
a collection of ServerDef objects describing the servers
Throws: DKException
if internal error occurs from server
Overrides:
listDataSources in class dkAbstractDatastore public String[] listDataSourceNames( ) throws DKException
Gets a list of datasource names.
Returns:
an array of datasource names Throws: DKException
if error occurs when retrieving datasource names
Overrides:
listDataSourceNames in class dkAbstractDatastore public void addObject(dkDataObject dataobj) throws DKException, Exception
Adds a DDO object.
Parameters:
ddo—a Federated object to be added.
Throws: DKException
if error occurs during add.
Overrides:
addObject in class dkAbstractDatastore public void deleteObject(dkDataObject dataobj) throws DKException, Exception
Deletes a data object.
Parameters:
ddo—a federated DDO object to be deleted
Throws: DKException
if error occurs during delete.
Overrides:
deleteObject in class AbstractDatastore public void retrieveObject(dkDataObject dataobj) throws DKException, Exception
Retrieves a data-object.
Parameters:
ddo—document object to be retrieved.
Throws: DKException
when retrieve failed.
Overrides:
retrieveObject in class dkAbstractDatastore public void updateObject(dkDataObject dataobj) throws DKException, Exception
Updates a data-object.
Parameters:
ddo—the data-object to be updated.
Throws: DKException
if error occurs in the datastore
Overrides:
updateObject in class dkAbstractDatastore public void commit( ) throws DKException
Commits all activities since the last commit.
Throws: DKException
is thrown since federated datastore does not support transaction scope for now.
Overrides:
commit in class dkAbstractDatastore public void rollback( ) throws DKException
Rolls back all activities since the last commit.
Throws: DKException
is thrown since Federated does not support transaction scope for now.
Overrides:
rollback in class dkAbstractDatastore public boolean isConnected( )
Checks to see if the datastore is connected
Returns:
true if connected, false otherwise
Overrides:
isConnected in class dkAbstractDatastore public DKHandle connections throws Exception
Gets the connection handle for the datastore.
Returns:
the connection handle
Overrides:
connection in class dkAbstractDatastore public DKHandle handle(String type) throws Exception
Gets a datastore handle.
Parameters:
type—type of datastore handle wanted
Returns:
a datastore handle
Overrides:
handle in class dkAbstractDatastore public String userName( )
Gets the user name that user used to logon to the datastore.
Returns:
the userid that user used to logon
Overrides:
userName in class dkAbstractDatastore public String datastoreName( ) throws Exception
Gets the name of this datastore object. Usually it represents a datastore source's server name.
Returns:
datastore name
Overrides:
datastoreName in class dkAbstractDatastore public String datastore( ) throws Exception
Gets the datastore type for this datastore object.
Returns:
datastore type
Overrides:
datastoreType in class dkAbstractDatastore public dkDatastoreDef datastoreDef( ) throws DKException, Exception
Gets datastore definition.
Returns:
the meta-data (dkDatastoreDef) of this datastore
Overrides:
datastoreDef in class dkAbstractDatastore public dkCollection listEntities( ) throws DKException, Exception
Gets a list of federated entities from Federated server.
Returns:
a collection of dkEntityDef
Throws: DKException
if error occurs
Overrides:
listEntities in class dkAbstractDatastore public String[] listEntityNames( ) throws DKException, Exception
Gets a list of federated entities names from Federated server.

Returns:
an array of names
Throws: DKException
if error occurs
Overrides:
listEntityNames in class dkAbstractDatastore public String[] listTextEntityNames( ) throws DKException, Exception
Gets a list of federated text search entities names from Federated server.
Returns:
an array of names
Throws: DKException
if error occurs public String[] listParmEntityNames() throws DKException, Exception
Gets a list of federated parametric search entities names from Federated server.
Returns:
an array of names
Throws: DKException
if error occurs
Overrides:
listEntityAttrs public dkCollection listEntityAttrs(String entityName) throws DKException, Exception
Gets a list of attributes for a given entity name.
Parameters:
entityName—name of entity to retrieve attributes for
Returns:
a dkCollection of dkAttrDef objects
Throws: DKException
if the entity name does not exist
Overrides:
listEntityAttrs in class dkAbstractDatastore public String[] listEntityAttrNames(String entityName) throws DKException, Exception
Gets a list of attribute names for a given entity name.
Parameters:
entityName—name of entity to retrieve attribute names for
Returns:
an array of attribute names
Throws: DKException
if the entity name does not exist
Overrides:
listEntityAttrNames in class dkAbstractDatastore public String registerMapping(DKNVPair sourceMap) throws DKException, Exception
Registers a mapping definition to this datastore. Mapping is done by entities.
Parameters:
sourceMap—source name and mapping, a DKNVPair class with the following possible values:
("BUFFER",):buffer_ref is a reference to a string in memory
("FILE",):file_name is the name of the file containing the mapping
("URL",):URL-address location of the mapping
("LDAP",): LDAP file-name
("SCHEMA",): a reference to a dkSchemaMapping object
defining the
mapping. Currently, only "SCHEMA" option is supported, others
may be
added later.
Returns:
the name of the mapping definition.
Overrides:
registerMapping in class dkAbstractDatastore
See Also:
unRegisterMapping public void unRegisterMapping(String mappingName) throws DKException, Exception
Unregisters mapping information from this datastore.
Parameters:
mappingName—name of the mapping information
Overrides:
unRegisterMapping in class dkAbstractDatastore
See Also:
registerMapping public String[] listMappingNames( ) throws DKException, Exception
Gets the list of the registered mappings for this datastore.
Returns:
an array of registered mapping objects' names. The array length would be zero if there is no mapping registered.
Overrides:
listMappingNames in class dkAbstractDatastore
See Also:
registerMapping public dkSchemaMapping getMapping(String mappingName) throws DKException, Exception
Gets mapping information from this datastore.
Parameters:
mappingName—name of the mapping information
Returns:
the schema mapping object
Overrides:
getMapping in class dkAbstractDatastore
See Also:
registerMapping public synchronized dkExtension getExtension(String extensionName) throws DKException, Exception
Gets the extension object from a given extension name.
Parameters:
extensionName—name of the extension object.
Returns:
extension object.
Overrides:
getextension in class dkAbstractDatastore public synchronized void addExtension(String extensionName, dkExtension extensionObj) throws DKException, Exception
Adds a new extension object.
Parameters:
extensionName—name of new extension object extensionObj—the extension object to be set
Overrides:
addExtension in class dkAbstractDatastore public synchronized void removeExtension(String extensionName) throws DKException, Exception
Removes an existing extension object.
Parameters:
extensionName—name of extension object to be removed
Overrides:
removeExtension in class dkAbstractDatastore public synchronized String[] listExtensionNames( ) throws DKException, Exception
Gets the list of extension objects' names.
Returns:
an array of extension objects' names
Overrides:
listExtensionNames in class dkAbstractDatastore public DKDDO createDDO(String objectType, int Flags) throws DKException, Exception
Creates a new DDO with object type, properties and attributes set for a given back-end server.
Parameters:
objectType—the object type
Flags—to indicate various options and to specify more detailed characteristics of the DDO to create. For example, it may be a directive to create a document DDO, a folder, etc.
Returns:
a new DDO of the given object type with all the properties and attributes set, so that the user only needs to set the attribute values
Overrides:
createDDO in class dkAbstractDatastore public dkCollection listSearchTemplates( ) throws DKException, Exception
Gets a list search templates from a federated server.
Returns:
a DKSequentialCollection of search templates
Throws: DKException
if internal datastore error occurs public String[] listSearchTemplateNames( ) throws DKException, Exception
Gets a list search templates' names from a federated server.
Returns:
an array of search template names
Throws: DKException
if internal datastore error occurs public dkSearchTemplate getSearchTemplate(String templateName) throws DKException, Exception
Gets a search template information from a given template name.
Returns:
dkSearchTemplate object.
Throws: DKException
if internal datastore error occurs public void destroy( ) throws DKException, Exception
datastore destroy—datastore cleanup if needed
Overrides:
destroy in class dkAbstractDatastore public synchronized string addRemoveCursor (dkResultSetCursor iCurt int action) throws DKException, Exception
public dkDatastore datastoreByServerName (String dsType, String dsName) throws DKException, Exception
Gets a reference to the specified datastore. The datastore must be connected, otherwise it will return null even if one is found. First, it will look in the free connection pool. If none found, it will look under the connection pool held by active cursors.

public void changePassword (String serverName,
String user Id,
String oldPwd,
String newPwd)
throws DKException, Exception
Changes the password of a given user Id for a specified server. Administrator only function.
Parameters:
userId—the user-id
oldPwd—the old password
newPwd—the new password public void requestConnection (String serverName,
String userId,
String passwd,
String connectString) throws DKException, Exception
Requests a connection to a particular server with the given userid, password & connectString.
Parameters:
userId—the user Id
passwd—the password
connectstring—the connect string to logon public void excludeServer (Sting serverName, String templateName) throws DKException, Exception
Requests the named server to be skipped for the named search template.
Parameters:
serverName—a back end server name
templateName—a search template name public boolean isServerExcluded (String serverName, String templateName) throws DKException, Exception, java.rmi.RemoteException
Checks if the given server is in the excluded list for the named search template.
Parameters:
serverName—a back end server name
templateName—a search template name
Returns:
true or false public String[] listExcludedServers(String templateName) throws DKException, Exception
Lists all the excluded servers for the named search template
Parameters:
s—templateName—a search template name
Returns:
an array of server names that were excluded during search public void clearExcludedServers(String templateName) throws DKException, Exception Clears all the excluded servers for the named search template
Parameters:
s—templateName—a search template name The following is sample syntax of a federated query string. However, it is to be understood that other syntax, including other parameters, may be used for the federated query string without departing from the scope of the invention.

```
PARAMETRIC_SEARCH=([ENTITY=entity_name,]
    [MAX_RESULTS=maximum_results,]
    [COND=(conditional_expression)]
    [; ...]
);
[OPTION=([CONTENT=yes_no]
    )]
[and_or
TEXT_SEARCH=(COND=(text_search_expression)
    );
    [OPTION=([SEARCH_INDEX={search_index_name |
    (index_list) };]
        [MAX_RESULTS=maximum_results;]
        [TIME_LIMIT=time_limit]
    )]
]
[and_or
IMAGE_SEARCH=(COND=(image_search_expression)
    );
    [OPTION=([SEARCH_INDEX={search_index_name |
    (index_list) };]
        [MAX_RESULTS=maximum_results;]
        [TIME_LIMIT=time_limit]
    )]
]
```

There are several mechanisms for users to submit federated queries for execution. For example, users can create a federated query string and pass it to a federated query object and then invoke an execute or evaluate method on that object to trigger the query processing. Alternatively, a user can pass the federated query string to the execute or evaluate method in the federated datastore to process the query directly. The query string will be parsed into a federated query canonical form (query expression), which is essentially a datastore neutral representation of the query. In case the input query comes from a graphical user interface (GUI) based application, the query does not need to be parsed and the corresponding canonical form can be directly constructed.

The query canonical form is the input for the federated query processor module. This module will perform the following tasks:

Query translation. Translates the query canonical form into several native queries that corresponds to each native datastore associated to this federated datastore. The translation information is obtained from the schema mapping.

Data conversion. Converts data in the query into a native data type for each of the associated native datastores. This process uses the mapping and conversion mechanisms described in the schema mapping.

Data filtering. Filters only the relevant data during the construction of native queries.

Each native query is submitted to the corresponding native datastore for execution. Initially, the results returned are cursors to the data in each datastore.

The end-result of an initial query is a federated result set cursor object, which is a virtual collection (i.e., at this time, data has not actually been retrieved) of cursors to objects in each of the native datastores.

The user can retrieve the actual data using a fetch. When a fetch is issued for data, the data is returned by the native datastores to the federated query results processor module, which will do the following:

Data conversion. Converts data from the native type into a federated type according to the mapping information.

Datafiltering. Filters the results to include only the requested data.

Result merging. Merges the results from several native datastores into a federated collection.

The federated result set cursor object provides the facility to separate query results according to the source native datastores. To do such a processing, the user/application may either use the federated cursor to fetch data or a native datastore cursor to fetch data from a particular datastore.

A FederatedQuery represents and executes queries across heterogeneous datastores. This query can be a combination of a DL parametric query, OnDemand query, and other query types involving supported datastores. To retrieve data from each datastore, the federated datastore delegates the query processing task to each of the native datastores.

DKFederatedQuery.java

```
package com.ibm.mm.sdk.common.DKFederatedQuery
public Class DKFederatedQuery
    extends Object
    implements dkQuery, DKConstant, DKMessageId, Serializable
{
public DKFederatedQuery(dkDatastore creator,
    String queryString)
public DKFederatedQuery(dkDatastore creator,
public DKFederatedQuery(DKFederatedQuery fromQuery)
public void prepare(DKNVPair params[ ]) throws DKException,
    Exception
public void execute(DKNVPair params[ ]) throws DKException,
    Exception
public int status( )
public Object result( ) throws DKException, Exception
public dkResultSetCursor resultSetCursor( ) throws DKException,
    Exception
public short qlType( )
public String queryString( )
public dkDatastore getDatastore( )
public void setDatastore(dkDatastore ds) throws DKException,
    Exception
public String getName( )
public void setName(String name)
public int numberOfResults( )
};
```

The following methods are part of the federated query class:

public DKFederatedQuery(dkDatastore creator, String queryString)
Constructs a Federated query.
Parameters:
creator—datastore
querystring—a query string public DKFederatedQuery(dkDatastore creator, DKCQExpr queryExpr)
Constructs a Federated query
Parameters:
creator—datastore
queryExpr—a query expression public DKFederatedQuery(DKFederatedQuery fromQuery)

Constructs a Federated query from a Federated query object.
Parameters:
fromQuery—Federated query public void prepare(DKNVPair params[]) throws DKException, Exception
Prepares a query.
Parameters:
params—additional prepare query option in name/value pair public void execute(DKNVPair params[]) throws DKException, Exception
Executes a query.
Parameters:
params—additional query option in name/value pair public int status( )
Gets query status.
Returns:
query status public Object results throws DKException, Exception
Gets query result.
Returns:
query result in a DKResults object public dkResultSetCursor resultSetCursor) throws DKException, Exception
Gets query result.
Returns:
query result in a dkResultSetCursor object public short qlType( )
Gets query type.
Returns:
query type public String queryString( )
Gets query string
Returns:
query string public dkdatastore getDatastore( )
Gets the reference to the owner datastore object.
Returns:
the dkdatastore object public void setDatastore(dkDatastore ds) throws DKException, Exception
Sets the reference to the owner datastore object.
Parameters:
ds—a datastore public String getName( )
Gets query name.
Returns:
name of this query public void setName(String name)
Sets query name.
Parameters:
name—new name to be set to this query object public int numberOfResults( )
Gets the number of query results.
Returns:
number of query results Schema Mapping A schema mapping represents a mapping between the schema in a datastore with the structure of the data-object that the user wants to process in memory. Schema mapping has been generally described in U.S. patent application Ser. Nos. 08/276,382 and 08/276,747, also assigned to IBM.

A federated schema is the conceptual schema of a federated datastore 100, which defines a mapping between the concepts in the federated datastore 100 to concepts expressed in each participating datastore schema. In general, a schema mapping handles the difference between how the data are stored in the datastore (as expressed by the datastore's conceptual schema) and how the user wants to process them in the application program. This mapping can also be extended to incorporate relationship associations among entities in a federated datastore, e.g., associating an employee's name with the appropriate department name. Since the mapping process can be a bit tedious, it is usually done with the help of a typical GUI-oriented schema mapping program.

In addition to schema-mapping information involving the mapping of entities and attributes, a federated datastore 100 must also have access to the following information:

User-id and password mapping. To support single sign-on features, each user-id in the federated datastore 100 needs to be mapped to its corresponding user-ids in the native datastores.

Datastore registration. Each native datastore needs to be registered so it can be located and logged-on to by the federated datastore 100processes on behalf of its users.

Extended Grand Portal Architecture

Figure 5:
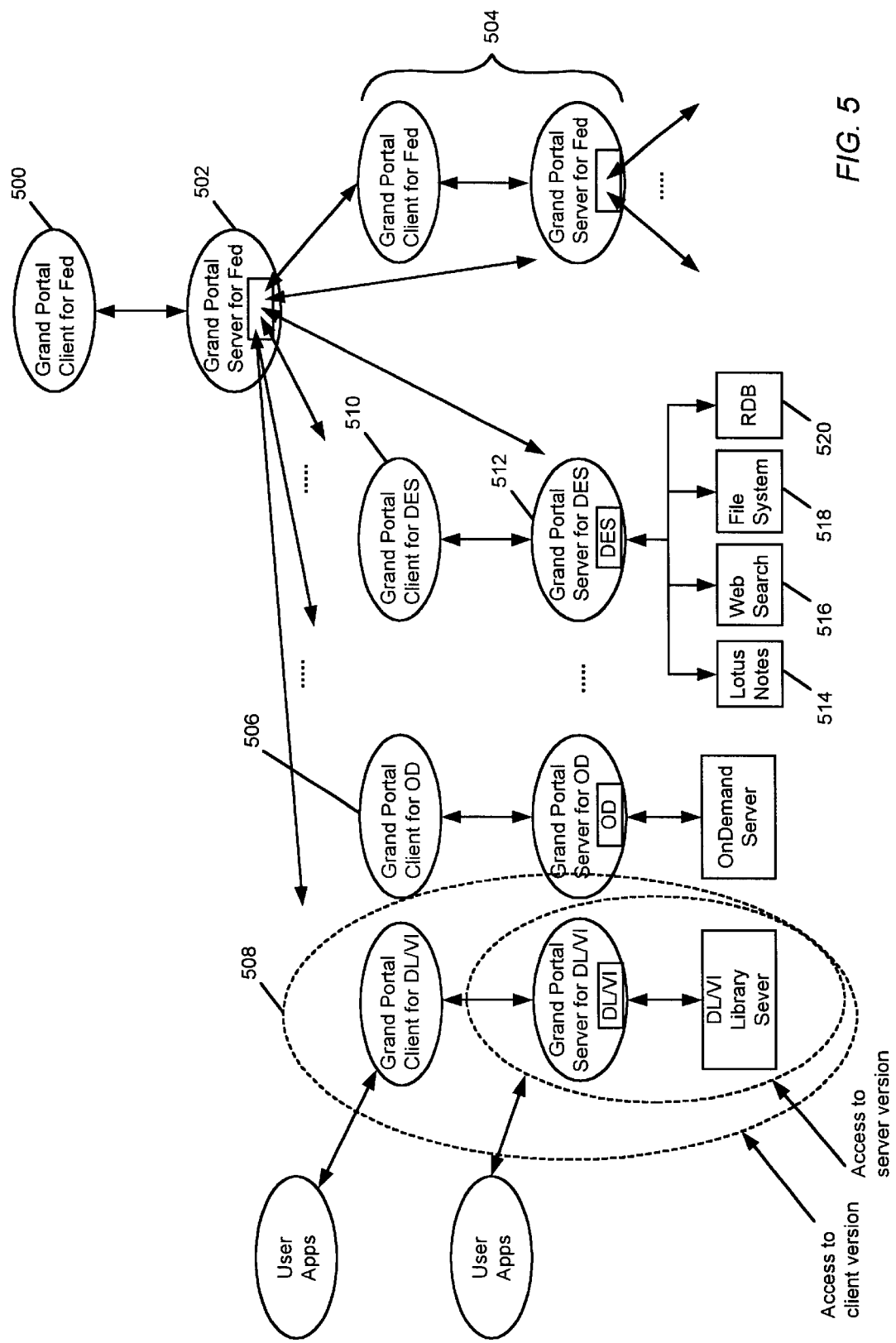
FIG. 5 is a diagram of an extended Grand Portal architecture.

In one embodiment, the invention is used within an extended Grand Portal Architecture. FIG. 5 is a diagram of an extended Grand Portal architecture. A Grand Portal client for a federated client datastore 500 is connected to a Grand Portal server for a federated server datastore 502. Another federated client/server system 504 may be connected to the federated server 502. A Grand Portal client/server system for an OnDemand (OD) datastore 506 may be part of the federation. Additionally, a Grand Portal client/server system for a Digital Library/VisualInfo (DL/VI) datastore 508 may be part of the federation. As with any of the datastores discussed herein, a user may access the client or the server directly. Therefore, user applications may reside at either the client or the server.

A Grand Portal client for a DES datastore 510 or a Grand Portal server for a DES datastore 512 may each be connected to the federation. While the DL/VI datastore enables searching a DL/VI Library server and the OD datastore enables searching of an OnDemand datastore, the DES datastore enables searching of multiple other datastores. In particular, the DES datastore enables searching of a Lotus Notes server 514, a Web 516, a file system 518, and a relational database 520.

Figure 6:
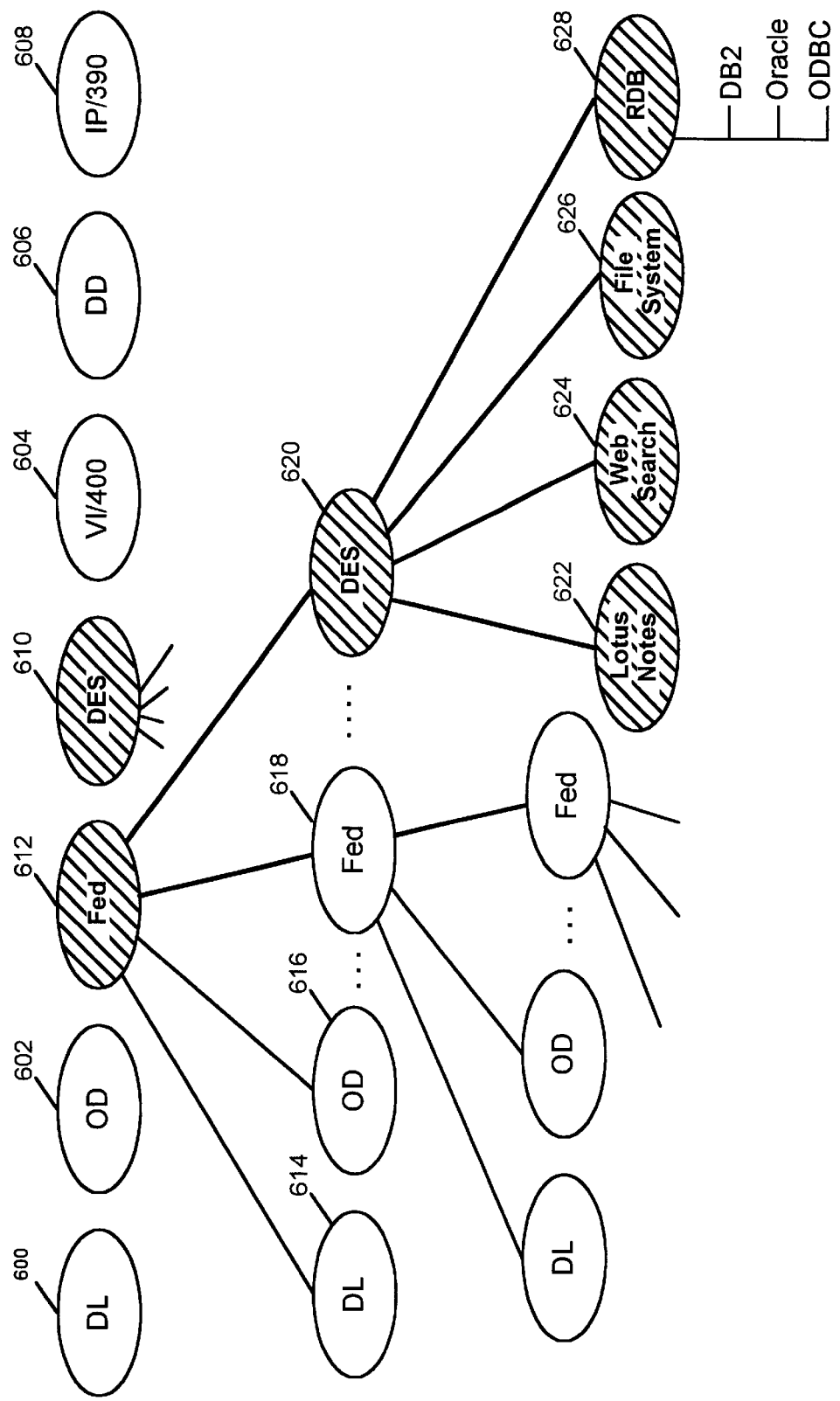
FIG. 6 is a diagram illustrating individual datastores and federated compositions.

FIG. 6 is a diagram illustrating individual datastores and federated compositions. In particular, a datastore can be configured as a stand-alone or as part of a federation. Additionally, a federated datastore can be composed of any number of datastores, including other federated datastores.

Stand-alone datastores may be accessed directly by a user. The following are example stand-alone datastores in FIG. 6: a Digital Library (DL) datastore 600, an OnDemand datastore 602, a VisualInfo/400 datastore 604, a Domino.Doc datastore 606, or a ImagePlus/390 datastore 608. Additionally, a DES datastore 610 maybe a stand alone in that it is not part of a federated composition. A federated composition 612 may include individual datastores 614 and 616, another federated datastore 618, and a search gateway to a DES datastore 620. In turn, the DES datastore 620 enables searching a Lotus Notes database 622, searching the Web 624, searching a file system 626, or searching a relational database 628 (e.g., DB2, Oracle, or ODBC).

Managing Results of Federated Searches Across Heterogeneous Datastores with a Federated Result Set Cursor Object An embodiment of the invention provides a federated result set cursor object. In particular, when a search is performed in a federated datastore, each "heterogeneous" or "native" datastore is searched. Then, a federated result set cursor object is returned, which points to the data. A cursor is an indicator that indicates the beginning of a set of data (e.g., records, files, etc.). A federated result set cursor object comprises a federated cursor that may be used to fetch data sequentially from each datastore and a native cursor for each native datastore that may be used to fetch data from a particular native datastore. For example, if the federated cursor initially points to data in a first datastore, serial fetches may be used to retrieve each piece of data in the first datastore, then the cursor is moved to another datastore, and fetches are used to retrieve data in this datastore. If a native datastore cursor is used to fetch data, the data is retrieved from the specified native datastore starting at the cursor position.

Figure 7:
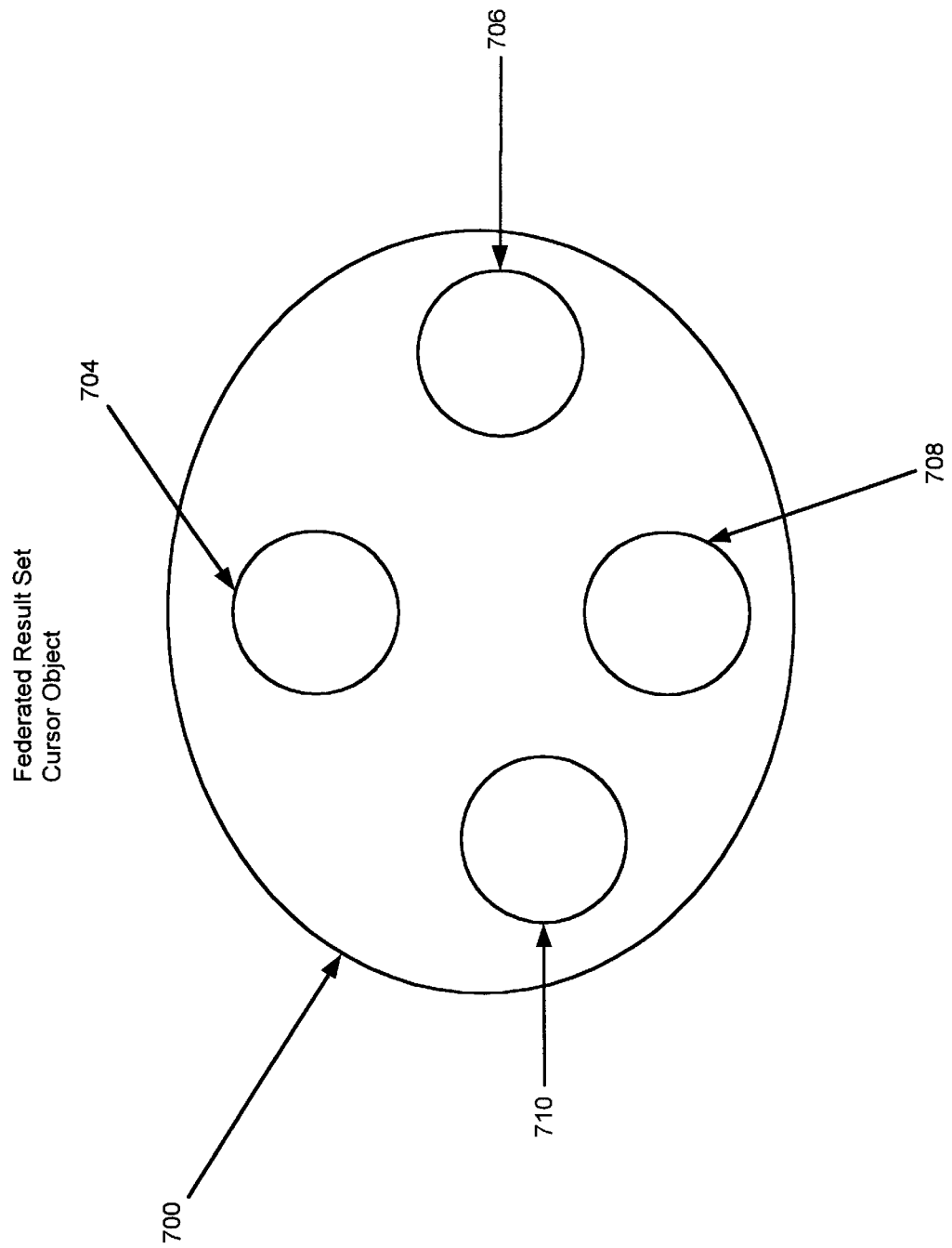
FIG. 7 is a diagram illustrating a conceptual view of a federated result set cursor object

FIG. 7 is a diagram illustrating a conceptual view of a federated result set cursor object. The federated result set cursor object 700 contains several individual cursors. The individual cursors include native cursors 704, 706, 708, and 710. A user or application may use any one of these cursors to fetch data.

When searching is performed in a federated datastore, the federated engine searches each heterogeneous datastore connected to the federated datastore. The federated engine may retrieve data from each separate datastore. Thus, the federated engine needs a technique for providing the data retrieved from multiple datastores in a single result set.

In one embodiment of the invention, one or more classes implement the federated result set cursor object, and one or more methods are provided to manipulate the federated result set cursor object. In one embodiment, the class definitions and methods reside at the federated datastore client and server.

In an object-oriented application, a result set cursor class is defined as a virtual collection in which the elements of the collection can be fetched one by one using fetch methods. One embodiment of the invention provides a data structure and methods to group data objects resulting from a query in a special result set cursor object.

Figure 8:
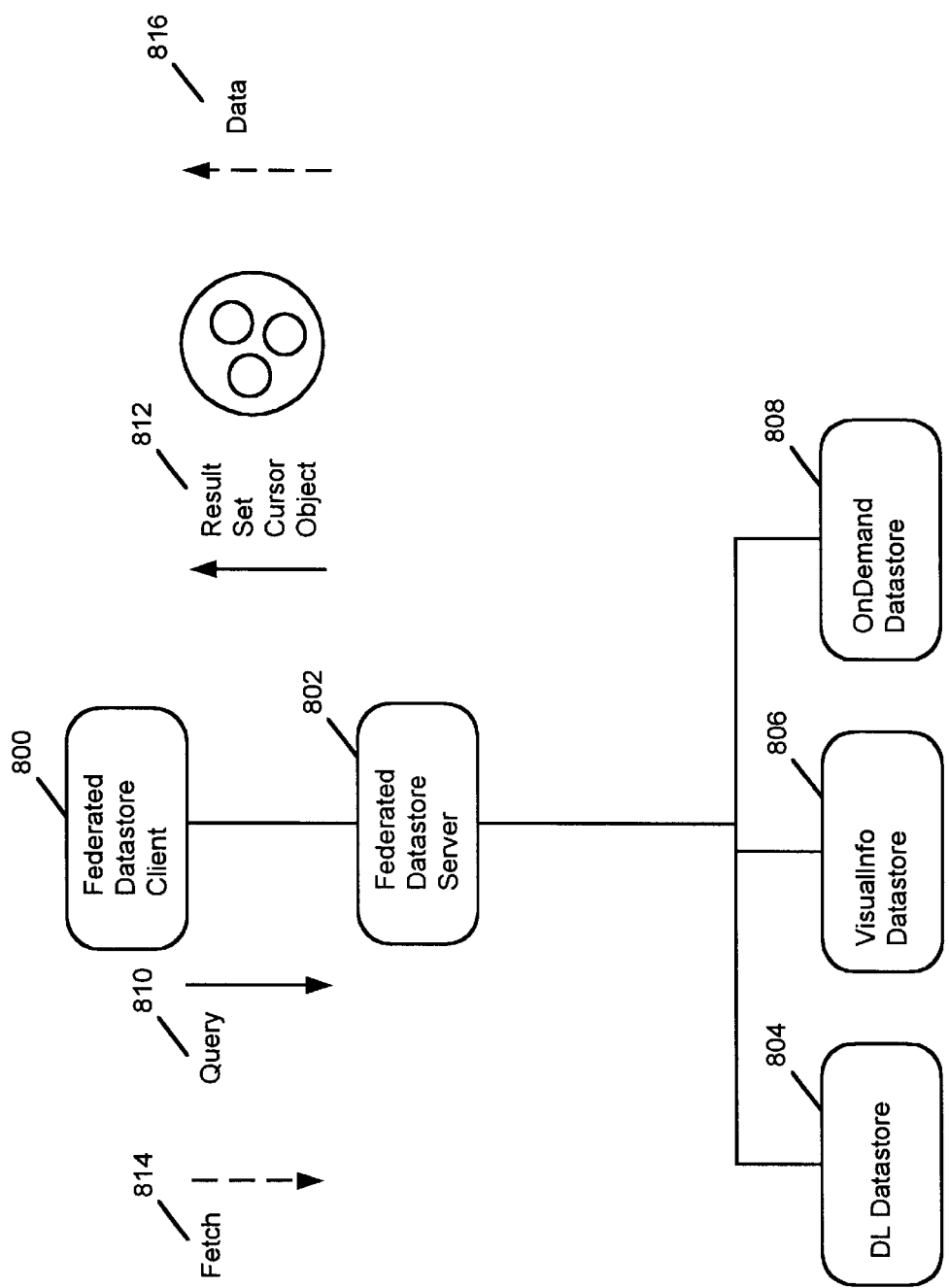
FIG. 8 is a diagram illustrating one use of the present invention.

FIG. 8 is a diagram illustrating one use of the present invention. A federated datastore client 800 is connected to a federated datastore server 802. The federated datastore server 802 is connected to several native datastores. The native datastores include a DL (Digital Library) datastore 804, a VisualInfo datastore 806, and an OnDemand datastore 808. Initially, if a user or application program would like to retrieve data from the native datastores, the user or application program initiates a query 810 at the federated datastore client 800. Although not shown, a user or application program may also initiate a query directly at the federated datastore server 802.

The federated datastore client 800 passes the query to the federated datastore server 802. Note that the federated datastore server 802 is able to determine the type of data to be retrieved (i.e., image or text) and recognizes which type of query each native datastore 804, 806, and 808 is able to process. Therefore, the federated datastore server 802 determines which native datastores are to receive the query. In this example, the federated datastore server 802 requests each native datastore 804, 806, and 808 to process the query.

Each native datastore 804, 806, and 808 performs a search for the requested data and sets a cursor to the data found in that native datastore 804, 806, and 808. The cursors are returned to the federated datastore client 800 in a federated result set cursor object 812. The federated result set cursor object 812 contains three circles that represent the three native datastore cursors. Additionally, the federated datastore server 802 selects one of the native datastore cursors as a beginning point for iterating through the found data. This selected native datastore cursor will be referred to in this example as a federated cursor.

At this time, a user or application program can submit a fetch request to actually retrieve desired data. For example, a user or application program may submit a fetch 814 specifying one of the cursors (i.e., a federated cursor or a native cursor). Then, the federated datastore client 800 passes the fetch 814 to the federated datastore server 802. The federated datastore server 802 obtains the data at the specified cursor location. In particular, the federated datastore server 802 requests the data from a particular native datastore. The native datastore returns the data at the cursor location. The federated datastore server 802 processes the data, including converting the data using a schema mapping to place the data in a form desired by a user or application program.

The data is returned to a user or application program from the federated datastore server 802 via the federated datastore client 800. The user or application program may submit additional fetch requests to obtain additional data. In particular, the user or application program may specify different cursors for each fetch request. Additionally, a user or application program may fetch the next piece of data using a fetch next command.

The results in the result set may be accessed with multiple techniques. For example, several result set cursors of data objects maybe aggregated while preserving each individual datastore result set cursor information. That is, the federated result set cursor object contains a federated cursor as well as native cursors. Each native datastore has a cursor indicating a position for reading the data in that datastore, and the federated cursor indicates a position for reading data from one of the datastores. Each result set cursor may be treated as one whole unit of a federated cursor, while the ability to access each individual result set cursor is preserved.

This structure is provided via a federated result set cursor object. The result set cursor object contains methods that allow a user or application program to fetch elements from the virtual collection.

An example class definition for a federated result set cursor (DKResultSetCursorFed.java) is set forth below.

---

DKResultSetCursorFed.java

```
package com.ibm.mm.sdk.server;
public Class DKResultSetCursorFed extends dkAbstractResultSetCursor
    implements DKConstantFed, DKMessageIdFed
{
public DKResultSetCursorFed (DKDatastoreFed ds,
            DKNVPair parm
            throws DKException, Exception parms[ ])
public boolean isScrollable( ) throws DKException, Exception;
public boolean isUpdatable( ) throws DKException, Exception;
public boolean isValid( ) throws DKException, Exception;
public boolean isOpen( ) throws DKException, Exception;
public boolean isBegin( ) throws DKException, Exception;
public boolean isEnd( ) throws DKException, Exception;
public boolean isBetween( ) throws DKException, Exception;
public int getPosition( ) throws DKException, Exception;
public void setPosition(int position, Object value) throws
    DKException, Exception;
public void setToNext( ) throws DKException, Exception;
public DKDDO fetchObject( ) throws DKException, Exception;
public DKDDO fetchNext( ) throws DKException, Exception;
public boolean fetchNext(int how_many, dkCollection collection)
    throws DKException, Exception;
public Object fetchObjectByName(String dataItemName) throws
    DKException, Exception;
public Object fetchNextByName(String dataItemName) throws
DKException, Exception;
public boolean fetchNextByName(String dataItemName, int how_many,
    Object [ ] array) throws DKException, Exception;
public DKDDO findObject(int position, String predicate) throws
    DKException, Exception;
public void deleteObject( ) throws DKException, Exception;
public void updateObject(DKDDO ddo) throws DKException, Exception;
public DKDDO newObject( ) throws DKException, Exception;
public void addObject(DKDDO ddo) throws DKException, Exception;
public void open( ) throws DKException, Exception;
public void open(DKNVPair parms[ ]) throws DKException, Exception;
public void close( ) throws DKException, Exception;
public void destroy( ) throws DKException, Exception;
public String datastoreName( ) throws Exception;
public String datastoreType( ) throws Exception;
public DKHandle handle(String type) throws Exception,
public int cardinality( ) throws Exception;
public synchronized dkResultSetCursorfetchNextRSCursor( )
    throws DKException, Exception;
public synchronized void addRSCursor(dkResultSetCursor rsCursor);
}
```

The following methods are part of the federated result set cursor class:

public boolean isScrollable( ) throws DKException, Exception;

Scrollable indicator that returns true if cursor can be scrolled forward and backward.

public boolean isUpdatable( ) throws DKException, Exception;

Updatable indicator that returns true if cursor is updatable.

public boolean isvalid( ) throws DKException, Exception;

Valid indicator that returns true if cursor is valid.

public boolean isOpen( ) throws DKException, Exception;

Open indicator that returns true if cursor is in an opened state.

public boolean isBegin( ) throws DKException, Exception;

Begin indicator that returns true if cursor is positioned at the beginning.

public boolean isEnd( ) throws DKException, Exception;

End indicator that returns true if cursor is positioned at the end.

public boolean isBetween( ) throws DKException, Exception;

Between data objects in cursor indicator that returns true if cursor is in between data objects in the cursor.

public int getPosition( ) throws DKException, Exception;

Gets the current cursor position and returns the current cursor position.

public void setPosition(int position, Object value) throws DKException, Exception;

Sets the cursor to the given position, with the parameter position providing a cursor position option and the parameter value providing a cursor position value.

public void setToNext( ) throws DKException, Exception;

Sets cursor to point to the position of the next data object in the cursor.

public DKDDOfetchObject( ) throws DKException, Exception;

Fetches the element in the cursor at the current position and returns a DDO.

public DKDDOfetchNext( ) throws DKException, Exception;

Sets cursor to point to the position of the next data object and fetches the element in the cursor at that position and returns a DDO.

public boolean fetchNext(int how_many, dkCollection collection) throws DKException, Exception;

Fetches the next N elements of the cursor and inserts them into the given collection, with the parameter how_many indicating how many elements the user or application program wants to be returned in the collection and the parameter collection indicating the collection where elements that are fetched are stored. Returns true if there is at least one data object returned.

public ObjectfetchObjectByName(String dataItemName) throws DKException, Exception;

Fetches the data item value in the cursor at the current position by data item name, with the parameter dataItemName indicating a data item name, and returns an Object.

public Object fetchNextByName(String dataItemName) throws DKException, Exception;

Sets cursor to point to the position of the next data object and fetches the data item value in the cursor at that position by data item name, with the parameter dataItemName indicating a data item name, and returns an Object.

public boolean fetchNextByName(String dataItemName, int how_many, Object [] array) throws DKException, Exception;

Fetches the next N data item values of the cursor and inserts them into the given array, with the parameter dataItemName indicating a data item name, the parameter how_many indicating how many data item values the user or application program wants to be returned in the collection, and with the parameter array indicating an array where the data item values that are fetched are stored. Returns true if there is at least one data item value returned.

public DKDDOfindObject(int position, String predicate) throws DKException, Exception;

Finds the data object which satisfies the given predicate, moves the cursor to that position, fetches the data object, and returns a DDO.

public void deleteObject( ) throws DKException, Exception;

Deletes element at the current cursor position from the datastore.

public void updateObject(DKDDO ddo) throws DKException, Exception;

Updates element at the current cursor position from the datastore.

public DKDDO newObject( ) throws DKException, Exception;

Constructs a new DDO of the same type as the items in the result and returns a DDO.

public void addObject(DKDDO ddo) throws DKException, Exception;

Adds an element to the datastore.

public void open( ) throws DKException, Exception;

Opens the cursor. This re-executes the query and repositions the cursor to the beginning.

public void open(DKNVPair parms[]) throws DKException, Exception;

Opens the cursor. This re-executes the query and repositions the cursor to the beginning. The parameter parms allows for parameters to be passed in for the reexecution of the query.

public void close( ) throws DKException, Exception

Closes the cursor and invalidates the result set.

public void destroy( ) throws DKException, Exception;

Destroys the cursor. This method allows for cleanup, before garbage-collection is done on this class.

public String datastoreName( ) throws Exception;

Gets the datastore name and returns the datastore name.

public String datastoreType( ) throws Exception;

Gets the datastore type and returns the datastore type.

public DKHandle handle(String type) throws Exception;

Gets a cursor handle with the parameter type indicating a type of cursor handle desired and returns a cursor handle.

public int cardinality( ) throws Exception;

Gets the number of query results and returns the number of query results.

public synchronized dkResultSetCursorfetchNextRSCursor( ) throws DKException, Exception;

Fetches the next result set cursor.

public synchronized void addRSCursor(dkResultSetCursor rsCursor);

Adds a resultSet cursor to this federated cursor.

The client application program may create and use a federated result set cursor object and fetch elements from the whole result set cursor across native datastore cursor (i.e., individual cursor) boundaries. Alternatively, the client application program may access each individual result set cursor and fetch elements from each group of results originated from a particular datastore.

One practical use of a federated collection object is to represent results of a query against several heterogeneous datastores. The embodiment of the invention allows an object oriented application program to manipulate data objects resulting from a multi-search query to heterogeneous datastores in a federated result set cursor that embodies result set cursors from each heterogeneous datastore. The federated result set cursor also preserves the sub-grouping relationships of data objects contained in the result set cursors from each heterogeneous datastore.

Such a result set cursor is very useful to represent the results of a query against heterogeneous datastores. The combined results of the multi-search query is a result set cursor that contains a result set cursor from each datastore. The client application program has a choice of fetching from the whole combined results with a flat result set cursor or to fetch from each datastore result set cursor individually while preserving the sub-grouping information and relationships.

This federated result set cursor would be created by the federated datastore to represent the results of a federated multi-search query.

A result set cursor is a feature supported by modern data base management systems, such as relational databases (e.g., DB2, Oracle, Sybase, Informix, etc.). All conventional result set cursors are flat in that they provide a single cursor to the retrieved data.

On the other hand, the embodiment of the invention provides a nested result set cursor, which can have any amount of depth, with each result set cursor containing data objects resulting from a query against a specific datastore. The nested or federated result set cursor aggregates the query results from a set of heterogeneous datastores. The nested or federated result set cursor may be used with a federated datastore and a federated query object to store the results of a query against heterogeneous datastores.

Figure 9:
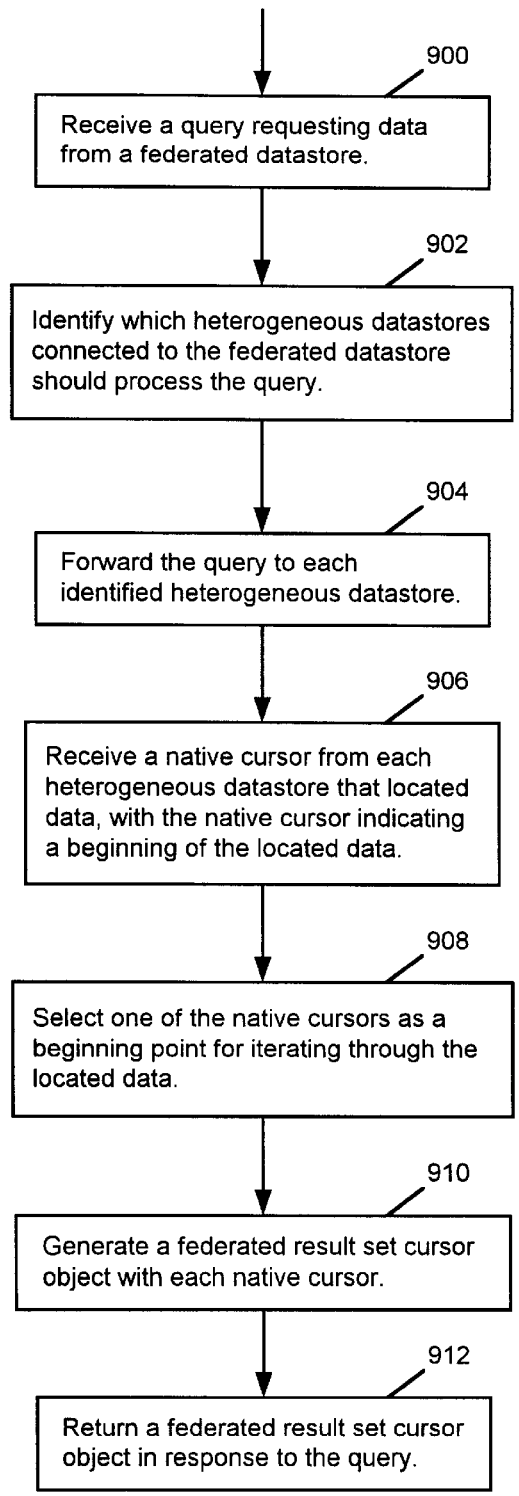
FIG. 9 is a flow diagram illustrating steps performed by a federated datastore to process a query.

FIG. 9 is a flow diagram illustrating steps performed by a federated datastore to process a query. In block 900, the federated datastore receives a query requesting data from the federated datastore. In block 902, the federated datastore identifies which heterogeneous datastores connected to the federated datastore should process the query. In block, 904, the federated datastore forwards the query to each identified heterogeneous datastore. In block 906, the federated datastore receives a native cursor from each heterogeneous datastore that located data, with the native cursor indicating a beginning of the located data. In block 908, the federated datastore selects one of the native cursors as a beginning point for iterating through the located data. In block 910, the federated datastore generates a federated result set cursor object with each native cursor. In block 912, the federated datastore returns a federated result set cursor object in response to the query.

Figure 10:
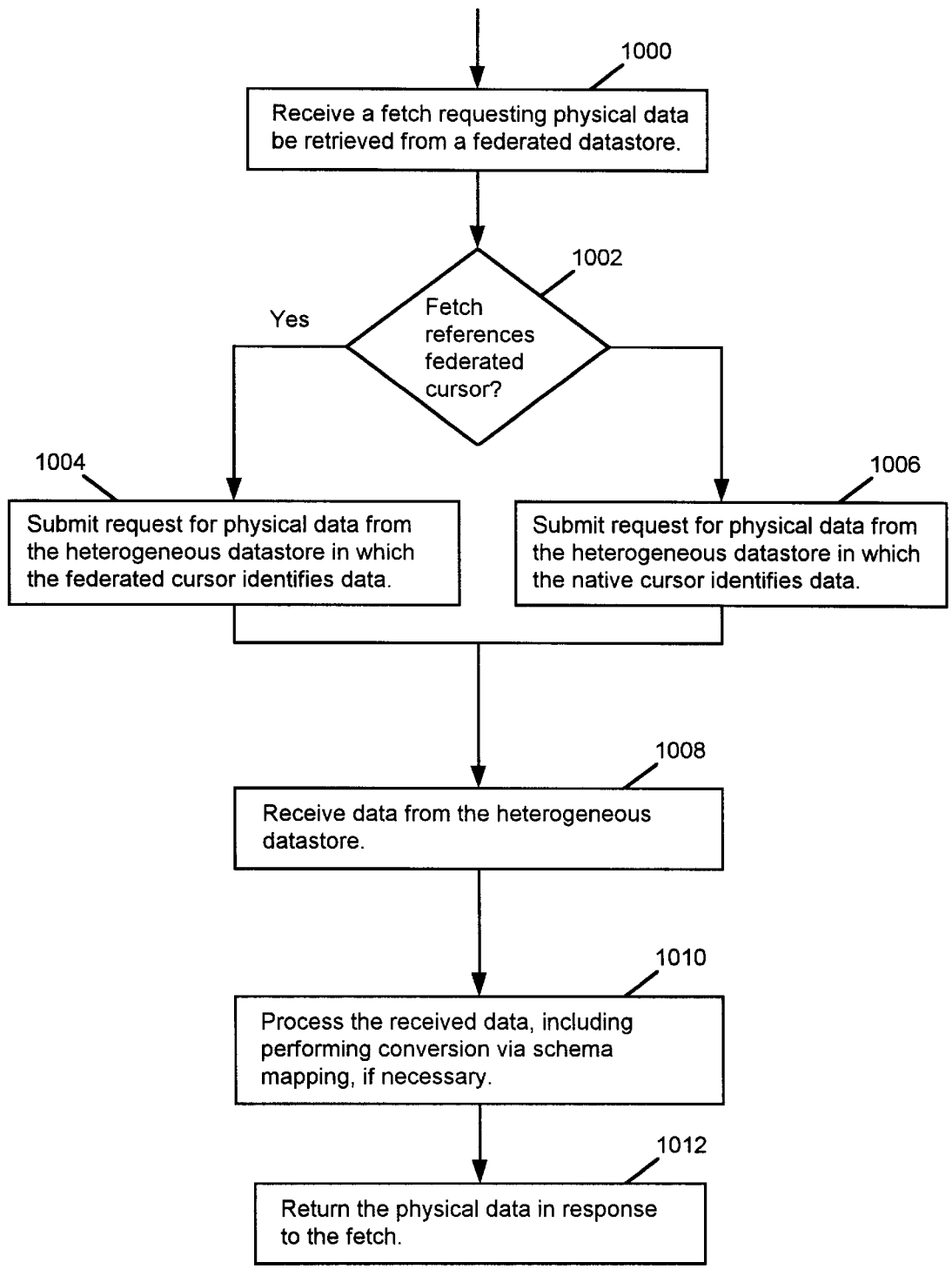
FIG. 10 is a flow diagram illustrating steps performed by a federated datastore to process a fetch.

FIG. 10 is a flow diagram illustrating steps performed by a federated datastore to process a fetch. In block 1000, the federated datastore receives a fetch requesting physical data be retrieved from the federated datastore. Note that the fetch can be for more than one piece of data and can indicate that a next piece of data is to be retrieved. In block 1002, the federated datastore determines whether the fetch references a federated cursor. If the fetch references a federated cursor, the federated datastore continues to block 1004, otherwise, the federated datastore continues to block 1006. In block 1004, the federated datastore submits a request for physical data from the heterogeneous datastore in which the federated cursor identifies data. In block 1006, the federated datastore submits a request for physical data from the heterogeneous datastore in which the native cursor identifies data. In block 1008, the federated datastore receives data from the heterogeneous datastore. In block 1010, the federated datastore processes the received data, including performing conversion via schema mapping, if necessary. In block 1012, the federated datastore returns the physical data in response to the fetch.

Conclusion

This concludes the description of the preferred embodiment of the invention. The following describes some alternative embodiments for accomplishing the present invention. For example, any type of computer, such as a mainframe, minicomputer, personal computer, mobile device, or embedded system, or computer configuration, such as a timesharing mainframe, local area network, or standalone personal computer, could be used with the techniques of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing one or more commands in a computer to perform a datastore operation at a computer, the method comprising the steps of:

locating data in one or more heterogeneous datastores;

setting a cursor to the located data in each heterogeneous datastore; and returning a federated result set cursor object, said federated result set cursor object aggregating the cursors to the located data.

2. The method of claim 1, wherein one of the cursors is a federated cursor.

3. The method of claim 1, wherein one of the cursors is a native cursor.

4. The method of claim 1, further comprising receiving a fetch command to retrieve located data.

5. The method of claim 4, wherein the fetch command specifies one of the cursors.

6. The method of claim 5, further comprising retrieving located data identified by the specified cursor.

7. An apparatus for executing one or more commands in a computer, comprising:

a computer having a datastore; and one or more computer programs, performed by the computer, for locating data in one or more heterogeneous datastores, setting a cursor to the located data in each heterogeneous datastore, and returning a federated result set cursor object, said federated result set cursor object aggregating the cursors to the located data.

8. The apparatus of claim 7, wherein one of the cursors is a federated cursor.

9. The apparatus of claim 7, wherein one of the cursors is a native cursor.

10. The apparatus of claim 7, further comprising receiving a fetch command to retrieve located data.

11. The apparatus of claim 10, wherein the fetch command specifies one of the cursors.

12. The apparatus of claim 11, further comprising retrieving located data identified by the specified cursor.

13. An article of manufacture comprising a program storage medium readable by a computer and embodying one or more instructions executable by the computer to perform method steps for executing one or more commands to perform a datastore operation at the computer, the method comprising the steps of:

locating data in one or more heterogeneous datastores;

setting a cursor to the located data in each heterogeneous datastore; and returning a federated result set cursor object, said federated result set cursor object aggregating the cursors to the located data.

14. The article of manufacture of claim 13, wherein one of the cursors is a federated cursor.

15. The article of manufacture of claim 13, wherein one of the cursors is a native cursor.

16. The article of manufacture of claim 13, further comprising receiving a fetch command to retrieve located data.

17. The article of manufacture of claim 16, wherein the fetch command specifies one of the cursors.

18. The article of manufacture of claim 17, further comprising retrieving located data identified by the specified cursor.

* * * * *